United States Patent [19]

Kikuchi

[11] 4,255,655
[45] Mar. 10, 1981

[54] TEMPERATURE SENSING SWITCH WITH AN OPTICAL SENSOR

[76] Inventor: Kikuo Kikuchi, 3-16-2, Kasukabe-higashi, Kasukabe-shi, Saitama-ken, Japan

[21] Appl. No.: 38,798

[22] Filed: May 14, 1979

[30] Foreign Application Priority Data

Dec. 13, 1978 [JP] Japan .......................... 53-172014[U]

[51] Int. Cl.³ ............................................. G01D 5/34
[52] U.S. Cl. .................................. 250/231 R; 73/343 R
[58] Field of Search ................. 73/343 R; 250/231 R; 236/78 A, 91 F

[56] References Cited

U.S. PATENT DOCUMENTS

| | | | |
|---|---|---|---|
| 2,954,479 | 9/1960 | Cibelius, Jr. | 250/231 R |
| 2,979,628 | 4/1961 | Gaon | 250/231 R X |
| 3,495,777 | 2/1970 | Evalds et al. | 250/231 R X |
| 3,788,795 | 1/1974 | Zeitlin | 250/231 R X |
| 3,931,514 | 1/1976 | Patterson | 250/231 R X |
| 4,087,684 | 5/1978 | Mott | 250/231 R |

Primary Examiner—Daniel M. Yasich
Attorney, Agent, or Firm—Zarley, McKee, Thomte, Voorhees & Sease

[57] ABSTRACT

A temperature sensing switch is disclosed which has a needle moving in response to the temperature within a translucent case. On the outside of this case are mounted one or a plurality of movable needle position detectors, in each of which a light emitter sends a beam of light through the case, to be picked up by a light detector. When the needle interrupts this beam of light, the light detector emits a signal. By moving these position detectors with respect to the case, the temperatures for production of these signals can be adjusted.

2 Claims, 3 Drawing Figures

TEMPERATURE SENSING SWITCH WITH AN OPTICAL SENSOR

BACKGROUND OF THE INVENTION

This invention relates to an automatic temperature sensing switch, which serves also as a thermometer, for a room, a hothouse or greenhouse, or the like.

In prior art temperature controllers and switches, a thermometer has been provided, and mechanical means have been used for sensing the temperature indication of the thermometer, perhaps including electrical contacts or variable resistances. However, these prior art switches have had defects. The contacts and variable resistances have been prone to wear, and also the mechanical force of the sensing mechanical means on the thermometer indicator has often affected the temperature indicated by the thermometer, causing unacceptable inaccuracy. Especially in conditions of high humidity, and environments containing explosive and/or corrosive gases, such switches have been found wanting.

SUMMARY OF THE INVENTION:

Therefore it is an object of the present invention to provide a temperature sensing switch free from the above defects.

According to the present invention, these and other objects are attained by a temperature sensing switch which displays a temperature indication, comprising a translucent case, an opaque needle inside the case, a thermosensitive means which moves the needle and provides a temperature indication by doing so, and a needle position detector, outside the case, which comprises a first and a second arms, on opposite sides of the case and connected around one side of the case, and movable with respect to the case, a light source mounted to the first arm, and a light sensor mounted to the second arm, opposing the light source and adapted to receive light emitted by it and transmitted through the case, wherein over the moving range of the needle position detector with respect to the case the light path from the light source associated with that needle position detector to the light sensor associated with that needle position detector is either unobstructed or obstructed only by the needle.

BRIEF DESCRIPTION OF THE DRAWINGS

The present invention, other objects, features, and advantages thereof, and also various methods of implementation and application of the present invention, will become better understood to a man skilled in the art in the light of the following description, which furnishes details of a preferred specific embodiment of the present invention, and also other explanation thereof. However, in the following specification, and in the description and the claims, it should be understood that, although parts have been identified by specific names for the purpose of convenience, such names are intended to be as generic in their application to similar parts as the art will permit. Further, the accompanying drawings and the figures thereof will also prove of assistance in grasping the essence of the present invention and the details of the purely illustrative and exemplary embodiment; however, it should be clearly understood by all those whom it may concern that the present invention is in no way intended to be limited by any particular details of the shown and discussed embodiment—which, although it may be preferred, is not exclusive of other possibilities—nor by any features of the drawings; the embodiment described, and also the drawings, being given for the purposes of illustration only, and therefore not at all restricting the scope of the present invention, which it is desired shall be defined solely and exclusively by the claim appended to the present specification, which sets forth, in particular, the novel features which are considered as characteristic of the present invention. In the drawings, like reference numbers denote like parts in the several figures, and:

DESCRIPTION OF THE PREFERRED EMBODIMENT

Figure 3:
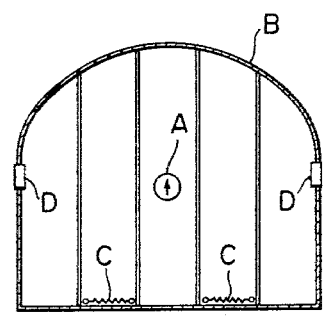
FIG. 3 is a side view of a greenhouse, showing the present invention mounted on one wall of it.

Referring to the drawings, a temperature sensing switch generally designated by A is shown. This switch A has a case 2 with a scale 1 marked thereon, which is made of translucent material, with the front totally transparent so that an operator can see through it. The back of the case 2 may be totally transparent, but need merely be translucent so as to pass some light. An opaque needle 3 is mounted inside the case 2 on a shaft 7 to which it is fixed. A thermosensitive means, which in the present embodiment is a bimetallic coil which is not shown in detail in the drawings and is enclosed in a holder 18, is adapted to move the needle by rotating the shaft 7 relative to case 2 so as to provide an indication of temperature. Any conventional means may be used to rotate the shaft 7 according to ambient temperature, of course. The shaft 7 projects to the outside of the case, in the present embodiment, and the holder 18 for the thermosensitive means is outside the case 2; but these are not essential features of the present invention. In some embodiments these could be entirely contained within a sealed case 2.

Several needle position detectors—two in the present embodiment, but more could be provided—are provided outside the case 2. In the present embodiment and in the drawings these are designated as 6 and 6a. These are movable with respect to the case, and in this embodiment are pivoted around the projecting ends of the shaft 7. Each comprises a first arm 4 or 4a and a second arm 5 or 5a, on opposite sides of the case 2. These two arms are connected around the side of the case so as to move together, and in the present embodiment have a knob 10 or 10a attached to them at their axially most remote point. On each of the first arms 4, 4a, there is mounted a light source 8, 8a, and on each of the second arms 5, 5a there is mounted a light sensor 9, 9a (which may be photoelectric cells or the like) opposing its respective light source, and adapted to receive light from it, transmitted through the translucent case 2.

Clearly, as the needle moves within the case, it either moves between the light source 8, for example, and the light sensor 9, so as to interrupt the light beam therebetween, or it does not interrupt said light beam. Further, the position of the needle position detector composed of the arms 4, 5 etc. can be altered with respect to the case over a certain range, and over this range of movement nothing other than (possibly) the needle 3 can interrupt this light beam. Therefore, by setting the needle position detector to desired locations, it is possible to receive signals from the light sensors associated therewith which will show when the temperature has come within a certain close range of the temperature set on the needle position detector, by the needle interrupting the light beam associated therewith.

Figure 2:
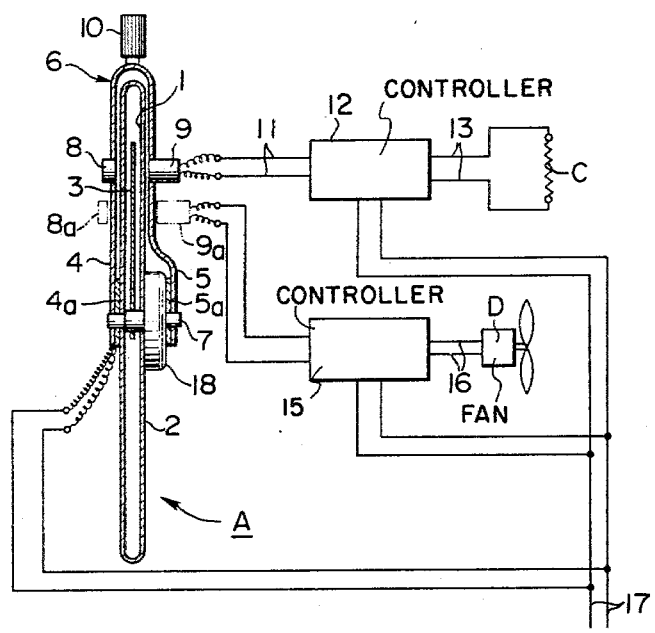
FIG. 2 is a schematic longitudinal cross-section, taken along the line II—II in FIG. 1, and coupled to a rather schematically drawn circuit for controlling a fan and a heater.

These signals from the light sensors can be used for a wide range of applications. FIG. 2 shows a cross-section of the temperature switch A of the present invention, and also shows the heater C and fan D, which are connected to controllers 12 and 15 by leading wires 13 and 16, and to a power source 17. The controllers 12 and 15 are connected to the light sensors 9 and 9a by leading wires 11 and 14, and the light sources 8 and 8a are connected to the power source 17. FIG. 3 shows the temperature switch A of the present invention fixed to the wall of a greenhouse B. Also provided to the greenhouse B are heaters C and fans D to keep it warm or cool as occasion demands. According to the signals from the light sensors, 9, 9a the controllers 12 and 15 may control the heaters C and the fans D.

Figure 1:
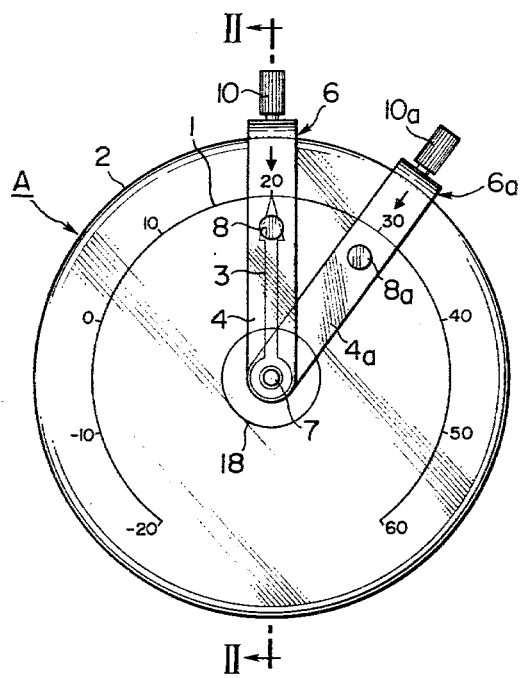
FIG. 1 is a plan view of an embodiment of the temperature sensing switch of the present invention.

In the embodiment shown in FIGS. 1 and 2, the room temperature in the greenhouse, and the actuating temperatures of the heaters C and the fans D are set at 20° C., 20° C., and 30° C., respectively, i.e. the needle position detectors 6, 6a are set at 20° C. and 30° C., respectively. Hence, when the room temperature is below 20° C., the heaters C are on, and when the room temperature is above 30° C., the fans D are on. In the temperatures between 20° C. and 30° C. the heaters C and the fans D are off. However, if necessary, the heaters C and the fans D may be driven dependently or independently.

Although the present invention has been shown and described with reference to a particular embodiment thereof, it should be understood that various changes and modifications of the form and the content thereof may made therein by one skilled in the art without departing from the scope of the invention. Therefore it is desired that the scope and breadth of the monopoly sought to be granted by Letters Patent should be defined uniquely by the legitimate and valid scope of the appended claim, which follows.

I claim as my invention:

1. A temperature sensing switch which displays a temperature indication, comprising
    a translucent case,
    an opaque needle inside the case,
    a shaft rotatably supported on said case, said needle being secured to said shaft for rotation therewith,
    a thermosensitive means operatively connected to said case and to said shaft for rotating said shaft and needle in response to temperature increases and decreases thereby to provide a temperature indication,
    at least one needle position detector disposed on the outside of the case and having first and second integral arms each having first ends which are pivotally supported on said shaft on opposite sides of the case and second ends which are connected together at a position radially externally of the case, said arms being manually pivotable with respect to the case to a selected one of a plurality of desired pivotal positions corresponding to respective temperature indications by said needle, a light source mounted to the first arm, a light sensor mounted to the second arm opposing the light source and adapted to receive light emitted therefrom and transmitted through the case so as to generate an electric signal,
    said needle being rotatable in response to a temperature change to a position between said first and second arms thereby interrupting said light between said light source and light sensor and the electric signal associated therewith.

2. A switch according to claim 1, including the plurality of said needle position detectors, each pivotally supported on said shaft on the outside of said case.

* * * * *